(12) United States Patent
Montagne et al.

(10) Patent No.: US 7,693,703 B2
(45) Date of Patent: Apr. 6, 2010

(54) CONFIGURATION OF RECONFIGURABLE INTERCONNECT PORTIONS

(75) Inventors: Xavier Montagne, Houilles (FR); Florent Bedoiseau, Savigny sur Orge (FR)

(73) Assignee: Mentor Graphics Corporation, Wilsonville, OR (US)

( * ) Notice: Subject to any disclaimer, the term of this patent is extended or adjusted under 35 U.S.C. 154(b) by 1245 days.

(21) Appl. No.: 10/631,824

(22) Filed: Aug. 1, 2003

(65) Prior Publication Data

US 2005/0027505 A1    Feb. 3, 2005

(51) Int. Cl.
G06F 9/455 (2006.01)
H03K 19/173 (2006.01)
H03K 19/177 (2006.01)
H01L 25/00 (2006.01)

(52) U.S. Cl. .............. 703/23; 703/24; 703/25; 703/26; 703/27; 703/28; 326/38; 326/39; 326/40; 326/41

(58) Field of Classification Search ......... 326/39–41; 703/13–28
See application file for complete search history.

(56) References Cited

U.S. PATENT DOCUMENTS

| 4,706,216 A * | 11/1987 | Carter ............ 365/94 |
| 5,036,473 A | 7/1991 | Butts et al. |
| 5,109,353 A | 4/1992 | Sample et al. |
| 5,777,489 A | 7/1998 | Barbier et al. |
| 5,821,773 A | 10/1998 | Norman et al. |
| 6,184,707 B1 | 2/2001 | Norman et al. |
| 6,265,894 B1 | 7/2001 | Reblewski et al. |
| 6,292,019 B1 * | 9/2001 | New et al. ............ 326/41 |
| 6,473,726 B1 | 10/2002 | Reblewski |

FOREIGN PATENT DOCUMENTS

| EP | 0 651 343 | 5/1995 |
| WO | WO 94/06210 | 3/1994 |

OTHER PUBLICATIONS

Charles Clos, "A Study of Non-Blocking Switching Networks", The Bell System Technical Journal, Mar. 1953, pp. 406-424.
Werner Erhard at al., "First Steps towards a Reconfigurable Asynchronous System", Friedrich-Schiller University Jena, Department of Computer Science, IEEE International Workshop on Rapid System Prototyping, Jun. 1999, pp. 28-31.
Fatih Kocan et al., "Concurrent D-Algorithm on Reconfigurable Hardware", IEEE 1999, pp. 152-155.

(Continued)

*Primary Examiner*—Vibol Tan
*Assistant Examiner*—Matthew C Tabler
(74) *Attorney, Agent, or Firm*—Banner & Witcoff, Ltd.

(57) ABSTRACT

Configuring reconfigurable interconnect resources employing a switch matrix and configuration bit look-up table are disclosed. Reconfigurable interconnect resources include multiplexors to decrease the number of bits needed to load a configuration. Distributed processing resources configure a selected reconfigurable interconnect resource, interconnecting each input of the reconfigurable interconnect resource with a particular output of the reconfigurable interconnect resource using configuration bits scalably extracted from a row of configuration bits of a look-up table. Use of a configuration bit look-up table allows for compression of the bits needed to load the configuration for a reconfigurable interconnect resource.

16 Claims, 13 Drawing Sheets

OTHER PUBLICATIONS

Jack Jean et al., "Dynamic Reconfiguration to Support Concurrent Applications", IEEE Transactions of Computers, vol. 48, No. 6, Jun. 1999, pp. 591-602.

Bernard Bosi et al., "Reconfigurable Pipelined 2-D Convolvers for Fast Digital Signal Processing", IEEE Transactions on Very Large Scale Integration (VLSI) Systems, vol. 7, No. 3, Sep. 1999, pp. 299-308.

A. Ejnioui et al., "Design Partitioning on Single-Chip Emulation Systems", Center for Microelectronics Research, Dept. of CSE, University of South Florida, $13^{th}$ International Conference on VLSI Design, 2000, pp. 234-239.

Greg Snider, "The Teramac Compiler", Hewlett-Packard, 1996, pp. 1-51.

Xilinix, "Programmable Gate Array Design Handbook", First Edition, 1986, pp. 1-A10.

Jonathan Babb, et al., "Logic Emulation with Virtual Wires", IEEE Transactions on Computer-Aided Design of Integrated Circuits and Systems, Jun. 1997, pp. 1-20.

\* cited by examiner

| Index Value | Number Of Bits | Config. Bit Table Row | Number of Output(s) (n) | Corresponding Output |
|---|---|---|---|---|
| 0 | 1 | 1 | 2 | $O_0$ |
| 1 | 1 | 2 | 2 | $O_1$ |
| 00 | 2 | 1 | 3 or 4 | $O_0$ |
| 01 | 2 | 2 | 3 or 4 | $O_1$ |
| 10 | 2 | 3 | 3 or 4 | $O_2$ |
| 11 | 2 | 4 | 4 | $O_3$ |
| 000 | 3 | 1 | 5,6,7 or 8 | $O_0$ |
| 001 | 3 | 2 | 5,6,7 or 8 | $O_1$ |
| 010 | 3 | 3 | 5,6,7 or 8 | $O_2$ |
| 011 | 3 | 4 | 5,6,7 or 8 | $O_3$ |
| 100 | 3 | 5 | 5,6,7 or 8 | $O_4$ |
| 101 | 3 | 6 | 6,7 or 8 | $O_5$ |
| 110 | 3 | 7 | 7 or 8 | $O_6$ |
| 111 | 3 | 8 | 8 | $O_7$ |
| ... | ... | ... | ... | ... |

|   | 802 | 804 | 806 | 808 |   |   |   |   |
|---|-----|-----|-----|-----|---|---|---|---|
|   |     |     |     |     |   |   |   |   |
| 812 | 1 | 0 | 0 | 0 | 0 | 0 | 0 | ⋮ |
| 814 | 0 | 1 | 0 | 0 | 0 | 0 | 0 | ⋮ |
| 816 | 0 | 0 | 1 | 0 | 0 | 0 | 0 | ⋮ |
| 818 | 0 | 0 | 0 | 1 | 0 | 0 | 0 | ⋮ |
|   | 0 | 0 | 0 | 0 | 1 | 0 | 0 | ⋮ |
|   | 0 | 0 | 0 | 0 | 0 | 1 | 0 | ⋮ |
|   | 0 | 0 | 0 | 0 | 0 | 0 | 1 | ⋮ |
|   | ⋮ | ⋮ | ⋮ | ⋮ | ⋮ | ⋮ | ⋮ | ⋮ |

800

CONFIGURATION OF RECONFIGURABLE INTERCONNECT PORTIONS

FIELD OF THE INVENTION

Aspects of the present invention are directed generally to the field of integrated circuits. More specifically, the present invention relates to configuration of reconfigurable interconnect resources used in an emulation system.

BACKGROUND OF THE INVENTION

Emulation systems typically were formed using emulation integrated circuits, including programmable logic devices (PLDs), such as general-purpose field programmable gate arrays (FPGAs), without integrating debugging facilities. To emulate a design on such an emulation system, the design would be "realized" by compiling a formal description of the design, partitioning the design into subsets, mapping various subsets to the logic elements (LEs) of the emulation integrated circuits of various logic boards of the emulations system, and then configuring various interconnects to interconnect the logic elements. The partitioning and mapping operations typically would be performed on workstations that were part of or complementary to the emulation systems, while the configuration information correspondingly would be downloaded onto the logic boards hosting the emulation integrated circuits, and then onto the emulation integrated circuits.

During emulation of a design in a PLD, such as a field programmable device (FPD), test stimuli are generated on the workstation or on a service board of the emulation system under control of the workstation, and then transferred to various logic boards for input into the PLDs for application to the various netlists of the design being emulated. Correspondingly, state data of various circuit elements, which may include data of interest of the design being emulated, would be read out of the applicable PLDs and then transferred off the logic boards for analysis on the workstation.

With advances in integrated circuit and emulation technology, other emulation systems began to employ PLDs specifically designed for emulation purposes. These special PLDs typically would include a substantial amount of on-chip reconfigurable logic elements, reconfigurable interconnects, memory, and debugging resources. As advances in the technology field continue, an increasing number of these on-chip reconfigurable logic elements, interconnects, memory, and debugging resources are packed into each PLD. As the number of reconfigurable emulation resources being included into a PLD increase, so does the number of control signals that have to configure each PLD.

Accordingly, there is an increasing amount of configuration data to be loaded for reconfigurable interconnect resources of each PLD. Emulation of a circuit design may require interconnecting many LEs within the same PLD as well as interconnecting those LEs with many other LEs residing on different PLDs or LEs residing on separate logic boards, each interconnection requiring configuration of reconfigurable interconnect resources to make the appropriate interconnection. Thus, there becomes a problem of how to load and/or compress all of this configuration data. More configuration memory is required to be downloaded to configure the increased number of reconfigurable interconnect resources. Thus, an improved approach to loading configuration data and compression of that data is desired.

SUMMARY OF THE INVENTION

There is therefore a need for an emulation system that can provide for distributed processing resources to locally configure selected reconfigurable interconnect resources employing a configuration bit look-up table in a scalable manner. The distributed processing resources may be instructed by a command to configure a selected reconfigurable interconnect, interconnecting each input of the reconfigurable interconnect with a particular output of the reconfigurable interconnect using configuration bits scalably extracted from a row of configuration bits of a look-up table.

According to another aspect of the present invention, an integrated circuit may include a reconfigurable interconnect portion, a data processing portion, and a storage unit. The data processing portion can be coupled to the reconfigurable interconnect device and the storage unit and can be configured to provide a bit pattern to the reconfigurable interconnect portion to load a configuration into the reconfigurable interconnect portion. The storage unit can be configured to include a configuration bit look-up table. By utilizing the configuration bit look-up table, the number of bits needed to configure the reconfigurable interconnect portion is reduced.

According to another aspect of the present invention, there is a method for configuring a reconfigurable interconnect portion in an emulation system. The method may include steps of receiving a command to configure a reconfigurable interconnect portion, thereby configuring a set of switches of the reconfigurable interconnect portion, determining configuration bits needed to configure the reconfigurable interconnect portion, and providing the determined configuration bits to the reconfigurable interconnect portion to configure the set of switches of the reconfigurable interconnect portion, wherein the configuration bits are derived from a configuration bit look-up table.

These and other features of the invention will be apparent upon consideration of the following detailed description of illustrative embodiments.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIG. 7 illustrates exemplary indices, in accordance with at least one aspect of an illustrative embodiment of the present invention;

FIG. 8 illustrates a configuration bit look-up table, in accordance with at least one aspect of an illustrative embodiment of the present invention;

DETAILED DESCRIPTION OF ILLUSTRATIVE EMBODIMENTS

In the following description of various illustrative embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
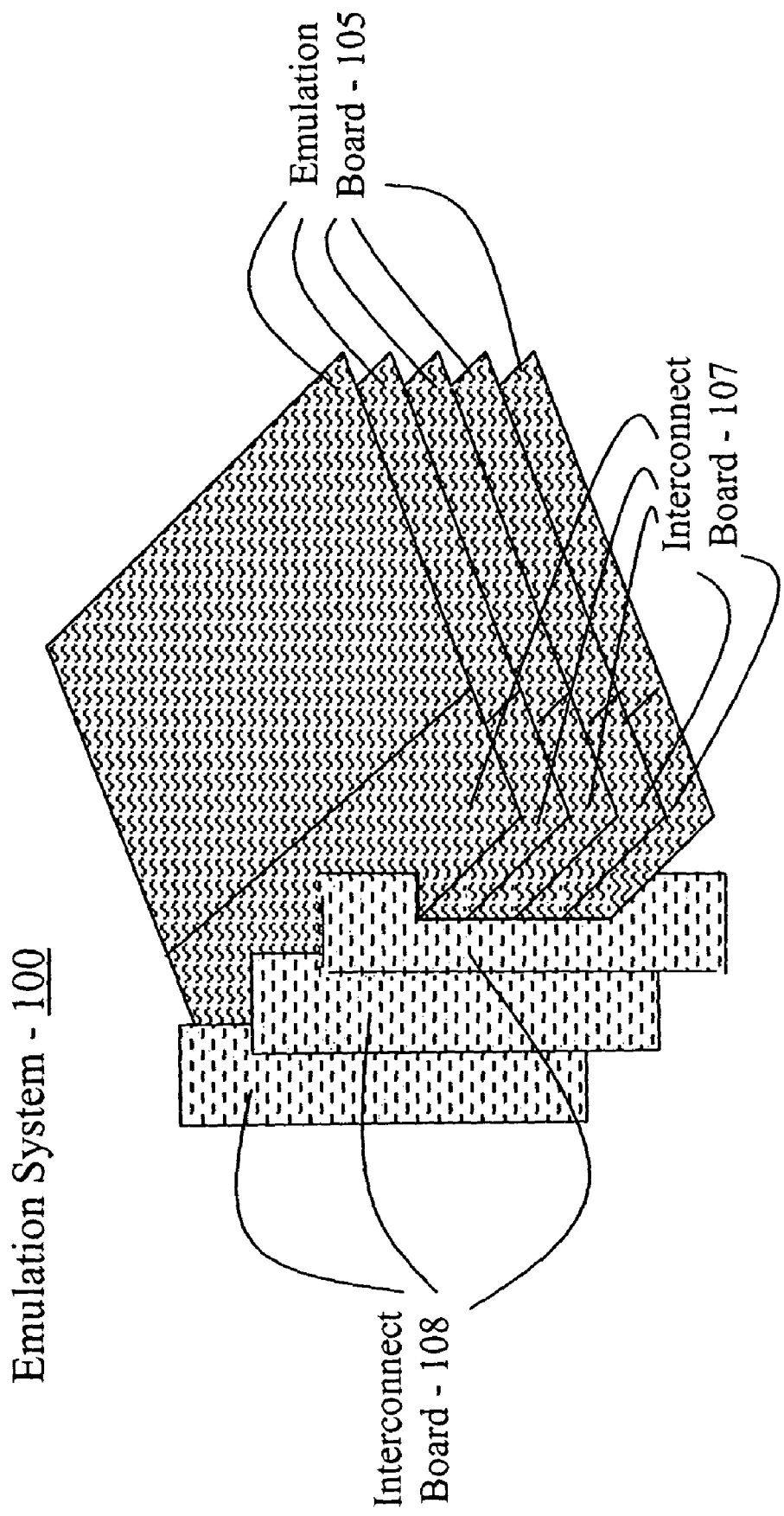
FIG. 1 illustrates an arrangement of logic boards in accordance with at least one aspect of an illustrative embodiment of the present invention.

Illustrated in FIG. 1 is an example of an arrangement for an emulation system 100. The emulation system 100 may include one or more emulation boards 105 coupled to each other via one or more interconnect boards 107 and 108 and control resources, wherein data processing resources of the various emulation boards 105 may be employed to perform, both locally and correspondingly (i.e., distributively), a number of emulation functions on behalf of and at the direction of the control resources. Interconnect boards 107 and 108 may include various integrated circuits. The emulation boards 105 may include various resources, such as, but not limited to, on-board emulation integrated circuits.

Figure 2:
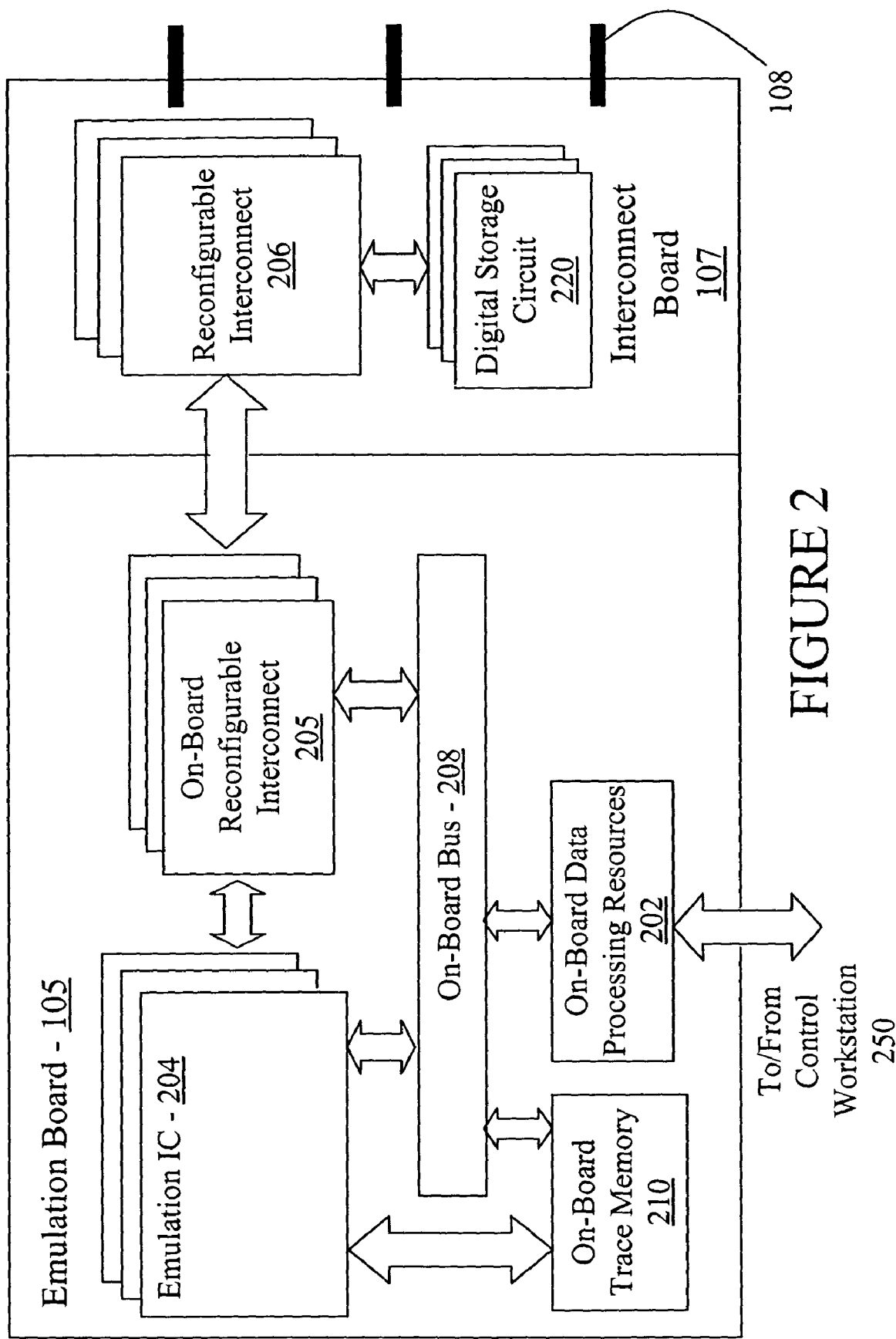
FIG. 2 illustrates an overview of an emulation system in accordance with at least one aspect of an illustrative embodiment of the present invention.

Referring to FIG. 2, for the illustrated embodiment, emulation board 105 includes on-board data processing resources 202, on-board emulation ICs 204, on-board reconfigurable interconnects 205, and on-board bus 208, and on-board trace memory 210 coupled to each other as shown (e.g., through on-board bus 208). Additionally, on-board emulation ICs 204 may also be directly coupled to on-board trace memory 210. Emulation board 105 may further include a number of I/O pins (not shown). A first subset of pins may be employed to couple selected ones of the outputs of on-board reconfigurable interconnects 205 to reconfigurable interconnects 206 of interconnect board 107, which in turn, may be coupled to interconnect boards 108, thereby coupling the emulation resources of a number of logic boards. A second subset of pins may be employed to couple data processing resources 202 to one or more control resources, such as a control workstation 250.

Interconnect boards 107 may include one or more reconfigurable interconnects 206 coupled to a number of digital storage circuits 220. The reconfigurable interconnects 206 may be coupled to reconfigurable interconnects (not shown) included on the interconnect boards 108. The reconfigurable interconnects included on the interconnect boards 108 may also be coupled to digital storage circuits of the type shown on interconnect boards 107. For ease of understanding, references will be made to a single reconfigurable interconnect 206 and a single digital storage circuit 220. However, as previously described, it should be appreciated by those skilled in the art that any number of reconfigurable interconnects 206 and digital storage circuits may be used. On-board bus 208 and on-board trace memory 210 may perform their conventional functions of facilitating on-board communication/data transfers, and collection of signal states of the various emulation signals of the assigned partition of the integrated circuit design being emulated. On-board data processing resources 202 distributively and correspondingly perform emulation functions responsive to testing and/or monitor requests from the control resources of the emulation system.

Digital storage circuit 220 may be a shift register, where information, such as bits representing 1's and 0's are stored and shifted. Such shifting may occur in response to a control signal, or may occur automatically according to a predetermined scheme. In one embodiment, the reconfigurable interconnect 206 may be a switching matrix for programmatically connecting n inputs to m outputs, such as, but not limited to, a crossbar switch. One embodiment may include a square switching matrix with a number of inputs n equal to a number of outputs m. Other embodiments may include a number of inputs n being different from a number of outputs m. In such a case, only a portion of the total number of inputs n or outputs m may be configured and/or utilized. Accordingly, an emulation system may be formed using multiple ones of interconnect boards 107 and 108, wherein digital storage circuits 220 may be employed to configure and/or test reconfigurable interconnects 206. The term "emulation" is used broadly herein and includes not only pure hardware emulation, but also the combination of hardware emulation and software simulation, as well as hardware acceleration and/or co-simulation.

Figure 3:
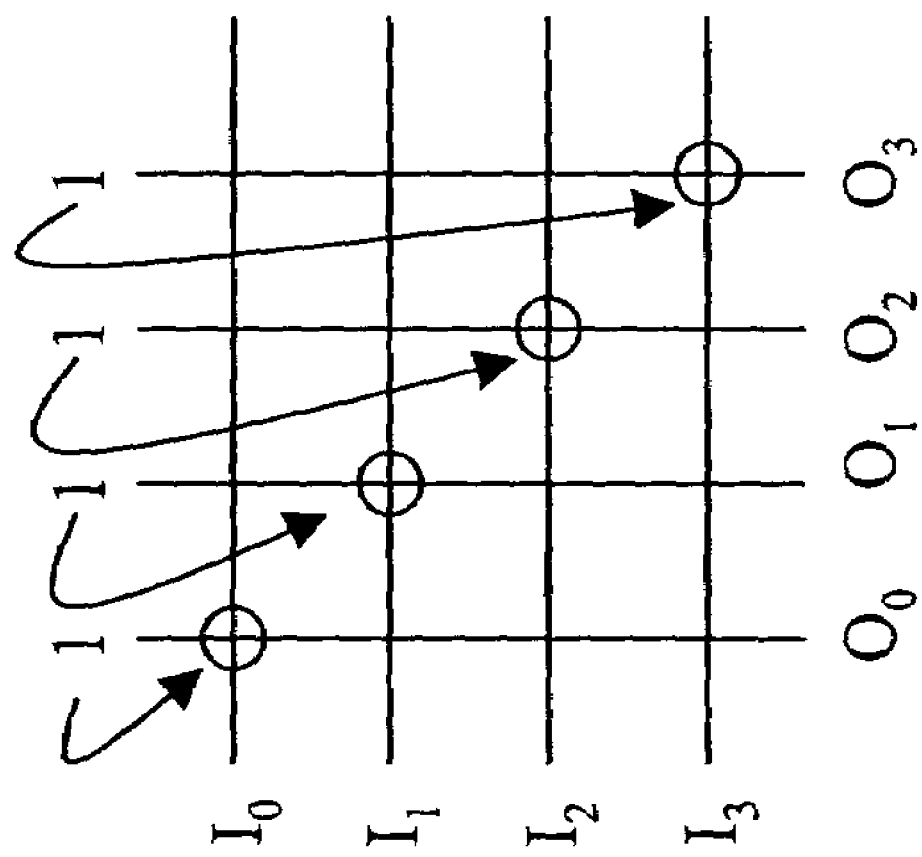
FIG. 3 illustrates an example configuration for inputs to outputs.

FIG. 3 is an illustration of an example configuration to load into the reconfigurable interconnect resource 206. FIG. 3 shows a 4-input-by-4-output reconfigurable interconnect resource where $I_0$ is connected with $O_0$, $I_1$ is connected with $O_1$, $I_2$ is connected with $O_2$ and $I_3$ is connected with $O_3$. The reference "1" is merely used to show that a connection exists between the corresponding horizontal path and the corresponding vertical path. Typically, in order to load a configuration for a 4-input-by-4-output reconfigurable interconnect resource, such as the one shown in FIG. 3, 16 bits are needed, i.e., the number of inputs, 4, multiplied by the number of outputs, 4. In other words, one bit would be used to represent each possible connection.

Figure 4A:
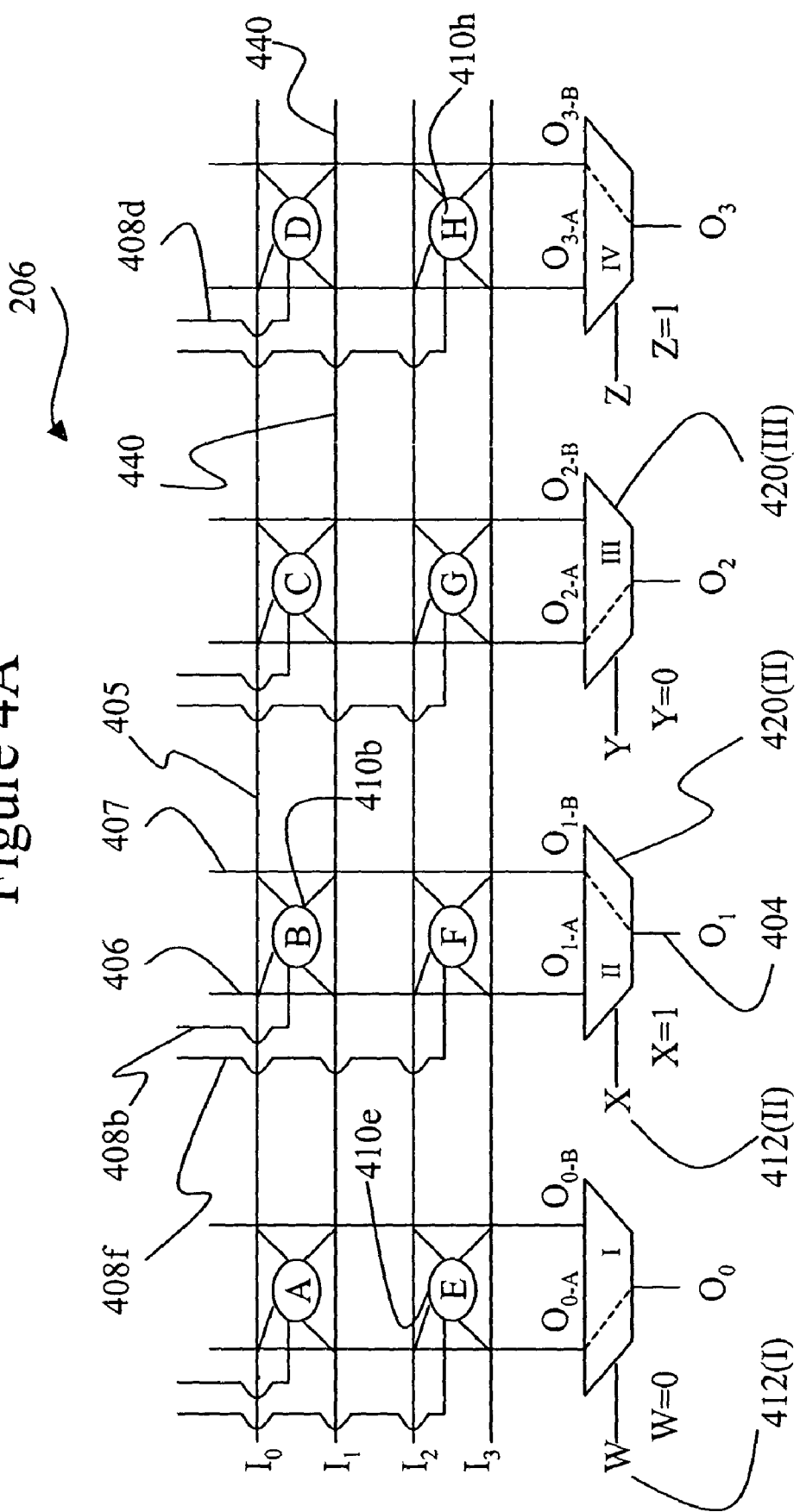
FIGS. 4A-4B illustrate a novel arrangement for configuring emulation components to facilitate configuration of the components, in accordance with at least one aspect of an illustrative embodiment of the present invention.

Referring to FIG. 4A, the reconfigurable interconnect 206 according to at least one aspect of the present invention is illustrated in further detail. The reconfigurable interconnect 206 is shown as a switching matrix having a number of horizontal paths, such as 405 and 440, a number of vertical paths, such as 406 and 407, and a number of switches 410a-410h for connecting any one of the inputs $I_0$-$I_3$ with any one of the outputs $O_0$-$O_3$, such as output $O_1$ 404. The horizontal paths may be operable as input lines $I_0$-$I_3$, and vertical paths may be operable as output lines $O_0$-$O_3$. The input lines $I_0$-$I_3$ are connectable to output lines $O_0$-$O_3$ through switches 410a-410h. A multiplexor 420(II) or other switch or selector is shown to select between vertical lines 406 and 407 to select which vertical line 406 or 407 will be connected to output $O_1$ 404. As illustrated in FIG. 4A, because a bit representing a "1" has been loaded into the multiplexor 420(II) at control signal X 412, vertical line $O_{1\text{-}B}$ 407 has been selected, thereby enabling vertical line 407 to be connected to output $O_1$ 404 instead of vertical line 406. As will be described below, control signals 408a-408h control the operation of switches 410a-410h and control signals 412(I-IV) control the operation of multiplexors 420(I-IV).

Although not illustrated in FIG. 4A, all of the switches 410a-410h may be coupled to a digital storage circuit, such as the digital storage circuit 220, and/or controlled by the on-board data processing resources 202. As stated above, the digital storage circuit 220 may be a shift register. The digital storage circuit 220 may be a four-bit shift register coupled to the four-input-by-four-output reconfigurable interconnect 206. However, the shift register may be of any size, such as a shift register of two bits or more, as further described below.

Figure 4B:
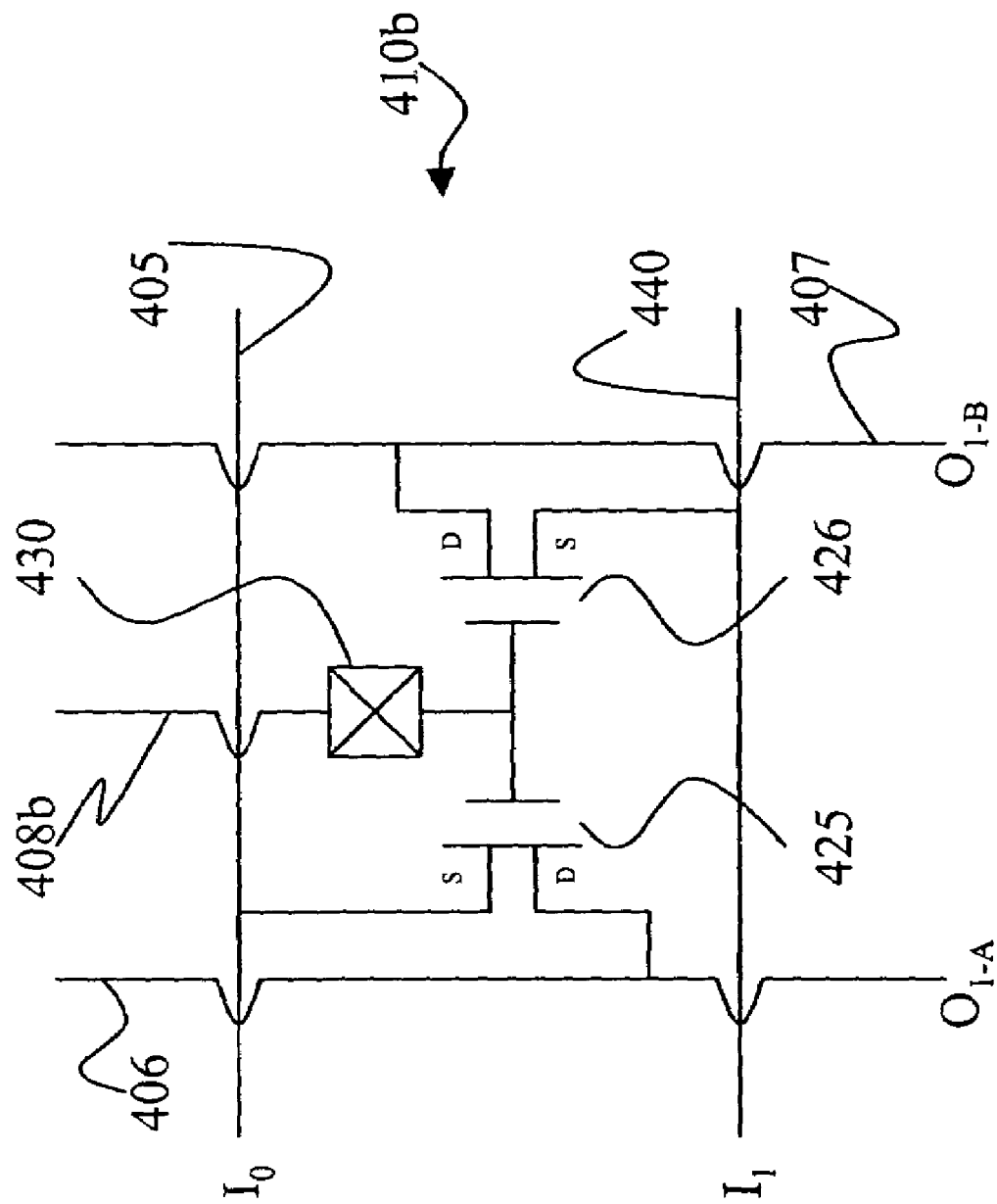

Referring now to FIG. 4B, a single illustrative switch 410b is shown in detail. The switch 410b may include a pair of transistors 425 and 426. Transistor 425 is shown with its source, S, connected to input line 405 and its drain, D, connected to output line 406. Transistor 426 is shown with its source, S, coupled to input line 440 and its drain, D, connected to output line 407. The gate of each transistor 425 and 426 may be coupled to and controlled by a memory element 430. The memory element 430 may be part of the switch 410b or outside of the switch 410b. Connection between the input line 405 and the output line 406 and between the input line 440 and the output line 407 is effectuated by applying a control signal at the gates of the transistors 425 and 426. Accordingly, memory 430 may be coupled to the digital storage circuit 220 via control line 408b, which provides the control signal and results in the memory element 430 storing a bit representing a "1" or a "0". Alternatively, the memory 430 may be an element of the digital storage circuit 220. When the memory element 430 stores a bit representing a "1", an "on" state for the switch 410b is represented (i.e., transistor 425 connects the horizontal input path 405 with the vertical output path 406 and transistor 426 connects the horizontal input path 440 with the vertical output path 407). When the memory element 430 stores a "0", an "off" state for the switch 410b is represented (i.e., transistor 425 does not connect the horizontal input path 405 with the vertical output path 406 and transistor 426 does not connect the horizontal input path 440 with the vertical output path 407).

In operation, and referring back to FIG. 4A, on-board data processing resources 202 controls the transmission of control signal 408b that is received by switch 410b in the reconfigurable interconnect 206. In particular, the control signal 408b is received by the memory element 430, thereby causing switch 410b to be in the "on" state or "off" state. Referring back to FIG. 3, in order for a configuration to be loaded into reconfigurable interconnect resource 206 connecting $I_0$ with $O_0$, $I_1$ with $O_1$, $I_2$ with $O_2$, and $I_3$ with $O_3$, appropriate control signals 408a-408h and 412(I-IV) are inputted into switches 410a-410h and multiplexors 420(I-IV). To obtain the configuration of the example shown in FIG. 3, switches 410a, 410b, 410g, and 410h designated as "A", "B", "G", and "H" are in an "on" state in FIG. 4A, while switches 410c, 410d, 410e, and 410f designated as "C", "D", "E", and "F" are in an "off" state. As stated above, when switch 410b is in an "on" state, horizontal input path 405 is connected to vertical output path 406 and horizontal input path 440 is connected to vertical output path 407 as shown in FIG. 4B. For switch 410b designated as "B", vertical output path $O_{1-A}$ 406 and vertical output path $O_{1-B}$ 407 are connected to inputs $I_0$ and $I_1$ respectively. Because the configuration example illustrated in FIG. 3 only requires input $I_1$ to be connected to output $O_1$, a second control signal, 412(II), is used to select between the two vertical output paths $O_{1-A}$ 406 and $O_{1-B}$ 407 to make the connection to output $O_1$ 404. For the illustrative example shown in FIG. 4A, because a control signal 412(II) of "X=1" is inputted to the multiplexor 420(II) designated by the reference "II", vertical output path $O_{1-B}$ 407 is connected to output $O_1$ 404. Control signal 412(II) is thus used to select between the two inputs of the multiplexor 420(II) to connect an input 406 or 407 of the multiplexor 420(II) to the output $O_1$ 404.

Therefore, in order to load a configuration of reconfigurable interconnect 206 consistent with the example shown in FIG. 3, switches 410a, 410b, 410g, and 410h designated as "A", "B", "G", and "H" are in an "on" state, while switches 410c, 410d, 410e, and 410f designated as "C", "D", "E", and "F" are in an "off" state. Further, multiplexors 420(II) and 420(IV) designated as "II" and "IV" are in an "on" state and multiplexors 420(I) and 420(III) designated as "I" and "III" are in an "off" state. By loading in such a manner, the number of bits needed to load the configuration of the reconfigurable interconnect resource is reduced from 16 bits for a 4-input-by-4-output reconfigurable interconnect to 12 bits according to at least one aspect of the present invention. Table 1 is an illustrative table showing the number of bits that are saved during loading of a configuration into a reconfigurable interconnect resource 206 according to at least one aspect of the present invention. As can be seen, the larger the interconnect, the larger the percentage of configuration bits that are saved.

TABLE 1

Bit Comparison for Loading Configuration

| n inputs to n outputs | Typical No. of Bits to Load Configuration | No. of Bits to Load Configuration accord. to aspects of the present invention | No. of Bits Saved | Percentage of Saved Bits |
|---|---|---|---|---|
| 4 × 4 | 16 | 12 | 4 | 25.00% |
| 6 × 6 | 36 | 24 | 12 | 33.33% |
| 8 × 8 | 64 | 40 | 24 | 37.50% |
| 16 × 16 | 256 | 144 | 112 | 43.75% |
| 32 × 32 | 1024 | 544 | 480 | 46.88% |
| 64 × 64 | 4096 | 2112 | 1984 | 48.44% |
| 128 × 128 | 16384 | 8320 | 8064 | 49.22% |

In FIGS. 4A-4B, a 4-input-by-4-output reconfigurable interconnect 206 is shown; however, it should be appreciated by one skilled in the art that the number of inputs n and outputs n in the reconfigurable interconnect 206 may be any number. In general, the number of configuration bits needed under the above-described embodiment is [{(# of inputs)/2}+1]*[# of outputs]. For example, those skilled in the art understand that a matrix for configuration purposes may include a number of inputs n that is different from a number of outputs m. In such a case, only a certain portion of the inputs n and/or outputs m may be configured and/or utilized. In an example of a 4-input-by-6-output matrix, only four (4) of the outputs may be configured and/or utilized. In addition, although input lines (horizontal paths) are paired within a switch, it should be understood by those skilled in the art that a square switching matrix having an odd number of inputs/outputs may still be configured according to at least one aspect of the present invention. In one embodiment, for an odd number of inputs/outputs square switching matrix, such as a 5-input-by-5-output square switching matrix, one input line may be separately configured to the other four input lines operating under the paired input line configuration. In such an embodiment, an additional system of components, steps, etc. may be utilized in order to allow for a fifth input line to be configured to any of the five (5) output lines.

However, even with the number of bits needed to load a configuration into a reconfigurable interconnect resource reduced, compression of the bits may even further reduce the number of configuration bits used. As described below, a look-up table can be utilized for a number of different sized reconfigurable interconnect resources 206 in order to further reduce the number of bits needed to load a configuration.

Figure 5:
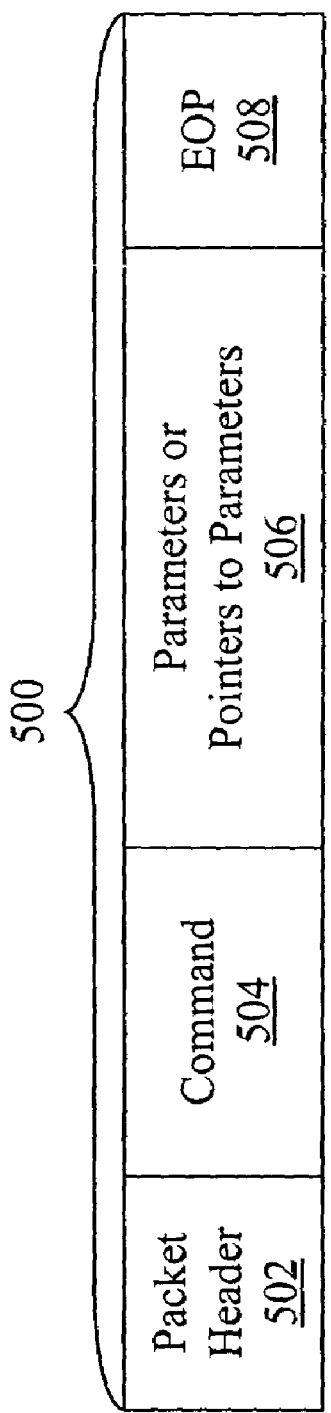
FIGS. 5-6 illustrate a communication packet and command structure incorporating the configuration of a reconfigurable interconnect resource, in accordance with at least one aspect of an illustrative embodiment of the present invention.

FIG. 5 illustrates an example packet suitable for use to communicate with the reconfigurable interconnect resource 206 in accordance with at least one aspect of the present invention. As shown in FIG. 5, communication packet 500 includes packet header 502, command field 504, zero or more parameters associated with the specified commands, or pointers to these parameters 506, and end of packet marker (EOP) 508. Packet header 502 and EOP 508 facilitate provision of various communication related control information. Command 504 facilitates communication between on-board data processing resources 202 and/or digital storage circuit 220 and the external entities (such as the workstation 250) on the tasks to be performed, and their results. Parameters or pointers thereto 506 augment the commands or return of results, where appropriate.

In one embodiment, command 504 comprises a configuration command, which, by itself or together with associated parameters or pointers 506 within communication packet 500, is received by on-board data processing resources 202 and/or digital storage circuit 220. The on-board data processing resources 202 and/or digital storage circuit 220 executes corresponding instructions to configure selected ones (or assigned ones) of multiple reconfigurable interconnect resources, such as reconfigurable interconnect 206, responsive to configuration instructions provided. According to one embodiment, communication packet 500 provides on-board data processing resources 202 and/or digital storage circuit 220 with configuration commands in comparison to the detailed configuration signals associated with configuring the assigned interconnect resources, or at least some portion of the assigned interconnect resources, thereby reducing the amount of data received from external entities outside an emulation board 204 (such as a control station).

Figure 6:
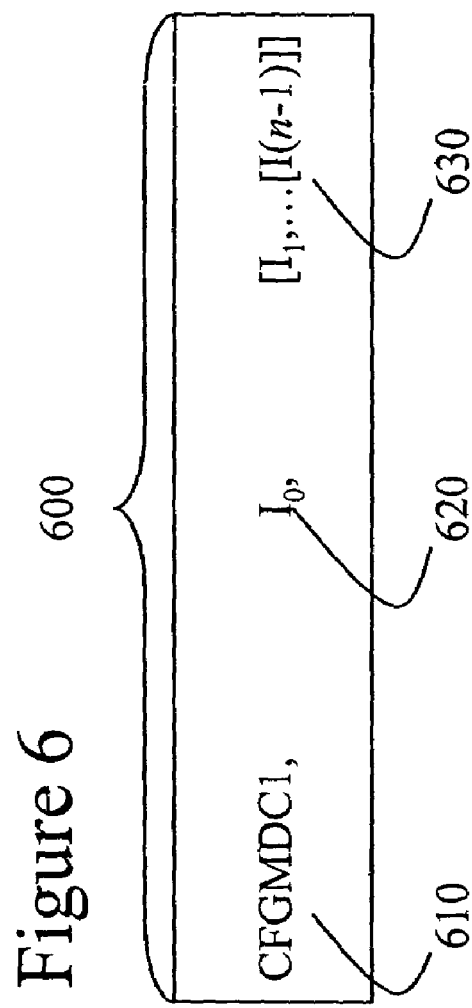

FIG. 6 illustrates an example command structure 600, in accordance with at least one embodiment, for configuring a reconfigurable interconnect resource 206. As illustrated in FIG. 6, configuration command 610 ("CFGMDC1") particularly identifies the reconfigurable interconnect resource 206 to be configured, pursuant to the parameters 620 ("$I_0$") and 630 ("[$I_1$, . . . [$I(n-1)$]]"). Here, the command field 504 includes the configuration command 610, and may be received by on-board data processing resources 202 and/or digital storage circuit 220 to load the configuration of the particular reconfigurable interconnect resource 206 named "MDC1," pursuant to the parameters 506 following the command 610. It should be appreciated by those skilled in the art that the particular syntax for parameters 506 is implementation specific. In accordance with one embodiment, parameter 620 ("$I_0$") represents information relevant to mapping the first input of "MDC1" to a particular output of "MDC1," the particular output being defined by attributes of the parameter 630 (such as number of bits and bit values) to be described more fully below. Parameter 630 ("[$I_1$, . . . [$I(n-1)$]]") is intended to represent optionally included information relevant to mapping successive inputs of "MDC1" to particular outputs. That is, if one parameter 606 is included subsequent to parameter 604, in accordance with one embodiment, then parameter 630 ("$I_1$") is intended to represent information relevant to mapping the second input of "MDC1" to a particular output of "MDC1," the particular output being defined by attributes of the parameter 630 (such as number of bits and bit values) to be described more fully below. In a similar manner, parameter 630 may include additional parameters, "$I_2$", "$I_3$", and so on up to "$I(n-1)$" where n is the number of inputs of the reconfigurable interconnect resource 206 named "MDC1."

As will be appreciated by those skilled in the art, the configuration command name "CFGMDC1" has been arbitrarily chosen. Likewise, the positional meanings given to parameter 620 ("$I_0$") and successive optional parameters 630 ("[$I_1$, . . . [$I(n-1)$]]") have been arbitrarily chosen for this particular illustration. Also, the number of parameters 506 is not limited. In an alternate embodiment, for instance, configuration command 610 may load configuration of a particular reconfigurable interconnect resource 206 without any parameters 506. Such a command, when received by on-board data processing resources 202 and/or digital storage circuit 220, may load configuration of the particular reconfigurable interconnect resource 206 in accordance with configuration information accessible to on-board data processing resources 202 and/or digital storage circuit 220. In another embodiment, a second configuration command 610 for configuring some portion of or all of the same reconfigurable interconnect resource 206, previously the subject of a first configuration command 610, may be received by on-board data processing resource 202 and/or digital storage circuit 220 to further configure the particular reconfigurable interconnect resource 206 or, alternatively, to reset one or more input-to-output mappings pursuant to parameters 506.

Referring back to the illustrative command structure 600 shown in FIG. 6, wherein configuration command 610 identifies a particular reconfigurable interconnect resource 206 to be configured, parameter 620 includes information relevant to the configuring or mapping of the first input of the particular reconfigurable interconnect resource 206 with a particular output of the same particular reconfigurable interconnect resource 206, with subsequent parameters 630 further mapping inputs-to-outputs. Parameters 620 and 630 are hereafter referred to as indices. Thus, parameter 630 ("$I_0$") is hereafter referenced as the index "$I_0$", where "$I_0$" is the first input to be mapped with an output. This terminology will be used when describing FIGS. 7-11 below.

FIG. 7 illustrates example coding indices, in accordance with one embodiment of the present invention. Each row of the table in FIG. 7 represents a mapping of an input I(n) (the "nth input") associated with the reconfigurable interconnect resource 206 to a corresponding output, pursuant to the configuration command structure 600. In general, the value of the coding index, in terms of binary bit values, and number of bits in the index value, in accordance with one embodiment, operates to uniquely identify a corresponding output for any given input. As an example, for row 702 the index value 704 shown is "0" (binary zero), the number of bits 706 is "1" (the index value "0" has one bit), the corresponding configuration bit table row 708 is "1" (as will be described below and illustrated in FIG. 8), the number of outputs (n) 710 available is "2" (n=2, indicating a 2-input-by-2-output reconfigurable interconnect resource), and the corresponding output 712 is $O_0$. Thus, if $I_0$=0, then $I_0$ is mapped to $O_0$. If $I_0$=1 as shown in row 714, then $I_1$ is mapped to $O_1$.

In this example, the coding index (or parameter 620) is 1 bit in length and may either have the value "0" or "1". Consequently a configuration command structure 600 includes a command 610 and one parameter 620 (the index for $I_0$) to completely characterize mapping each of two inputs with one of two outputs. For example, in accordance with one embodiment of the present invention, the command "CFGMDC1, 1"

would operate to configure "MDC1" as a 2-input-by-2-output reconfigurable interconnect resource 206, connecting $I_0$ with $O_1$ and $I_1$ with $O_0$ (as shown in rows 714 and 702).

FIG. 8 illustrates a configuration bit look-up table 800 in accordance with at least one aspect of the present invention. In general, configuration bit look-up table 800 includes a matrix of zeros with ones along one diagonal employable in a scalable manner. In one embodiment, rows of configuration bit look-up table 800 are indexed as illustrated in FIG. 7. Configuration bit table row 708 numbered "1" in FIG. 7 corresponds with the first row 802 shown in FIG. 8, configuration bit table row 708 numbered "2" in FIG. 7 corresponds with the second row 804, and row 708 numbered "3" in FIG. 7 corresponds with row 806, with subsequent numerical entries in configuration bit table row 708 corresponding to subsequent rows within configuration bit look-up table 800. Likewise, columns of the configuration bit look-up table 800 are referenced from right to left, column 812 representing $O_0$ connected with an input indexed to configuration bit table row 802, column 814 representing $O_1$ connected with an input indexed to configuration bit table row 804, column 816 representing $O_2$ connected with an input indexed to configuration bit table row 806, with subsequent columns in configuration bit look-up table 800 representing subsequent outputs.

In one embodiment, the two-by-two subset of configuration bit look-up table 800 formed by the intersection of configuration bit table rows 802 and 804 and configuration bit table columns 812 and 814 (shown boxed with broken lines in FIG. 8) correspond with rows 702 and 714 in FIG. 7, representing the configuration bits needed to configure a 2-input-by-2-output reconfigurable interconnect resource such as a 2-input-by-2-output reconfigurable interconnect resource 206. The two-by-two subset is accessed by extending the 1-bit indices (zero filling the most significant access bits), and as explained in more detail below, truncating the unneeded most significant bits of the row of configuration bits read out of look-up table 800.

The four-by-four subset of configuration bit look-up table 800 formed by the intersection of configuration bit table rows 802, 804, 806, and 808 and configuration bit table columns 812, 814, 816, and 818 (shown boxed with solid lines in FIG. 8) correspond with rows 716, 718, 720, and 722 in FIG. 7, representing the configuration bits needed to configure a 4-input-by-4-output reconfigurable interconnect resource such as a 4-input-by-4-output reconfigurable interconnect resource 206. The four-by-four subset of configuration bit look-up table 800 is a superset of the two-by-two subset. In like manner, the four-by-four subset is accessed by extending the 2-bit indices (zero filling the most significant access bits), and as explained in more detail below, truncating the unneeded most significant bits of the row of configuration bits read out of look-up table 800.

Similarly, a six-by-six subset is a superset of the four-by-four and the two-by-two subsets. The six-by-six subset is also accessed by extending the 2-bit indices (zero filling the most significant access bits), and as explained in more detail below, truncating the unneeded most significant bits of the row of configuration bits read out of look-up table 800. Subsequent subsets are supersets of the smaller subsets.

As configured, configuration bit look-up table 800 is scalable in its access and usage to accommodate configuration of n-input-by-n-output reconfigurable interconnect resources, wherein n is an integer chosen at design time, and all reconfigurable interconnect resources, such as reconfigurable interconnect resource 206, of sizes less than n-input-by-n-output may be configured using the same look-up table 800. Further, because only one input is connected to one output in an n-input-by-n-output reconfigurable interconnect resource, only one bit in each row of the configuration bit look-up table 800 will be designated by a "1" or "on" entry. Therefore, configuration bit look-up table allows for a significant reduction, e.g., compression, of the amount of data needed to store all applicable bit configurations. Only those bit patterns with a single "1" bit entry need be stored in the configuration bit look-up table 800. Table 2 illustrates the numbers of bits that can be saved in utilizing the configuration bit look-up table 800. Alternatively, it should be understood by those skilled in the art that the configuration bit look-up table 800 and the corresponding bit patterns for loading a configuration could be designed so that only those bit patterns with a single "0" bit entry need be stored in the configuration bit look-up table 800.

TABLE 2

Bit Comparison for Loading Configuration

| n inputs to n outputs | No. of bit patterns ($2^n$) | Indices | Bits Needed Per index | No. of Bits Needed to Load Configuration | No. of Bits Saved | Percentage of Saved Bits |
|---|---|---|---|---|---|---|
| 4 | 16 | 3 | 2 | 6 | 10 | 62.50% |
| 6 | 64 | 5 | 3 | 15 | 49 | 76.56% |
| 8 | 256 | 7 | 3 | 21 | 235 | 91.80% |
| 16 | 65536 | 15 | 4 | 60 | 65476 | 99.91% |
| 32 | 4294967296 | 31 | 5 | 155 | 4.29E+09 | ~100.00% |
| 64 | 1.8447E+19 | 63 | 6 | 378 | 1.84E+19 | ~100.00% |
| 128 | 3.4028E+38 | 127 | 7 | 889 | 3.4E+38 | ~100.00% |

In one embodiment, configuration bit look-up table 800 is implemented using on-board data processing resources 202. Configuration bit look-up table 800 may be stored within storage resources of on-board data processing resources 202, and accessing the configuration bits stored therein may involve on-board data processing resources 202 driving a plurality of address lines associated with the storage resources. In another embodiment, configuration bit look-up table 800 can be implemented using memory components such as a memory component of emulation integrated circuit 204 which are accessible by on-board data processing resources 202 via on-board bus 208.

Configuration bit look-up table 800 may be implemented in a software application, in hardware components, or in some combination of the two. Where a software application is used, the software application may be embodied as coded instructions written onto a computer-readable medium such as a magnetic disk, optical disc, and/or memory. Further, configuration bit look-up table 800 or portions of configuration bit look-up table 800 may be located, stored, and implemented in various portions of emulation system 100, including, but not limited to, emulation integrated circuits 204, on-board data processing resources 202, digital storage circuit 220, and control workstation 250.

Figure 9:
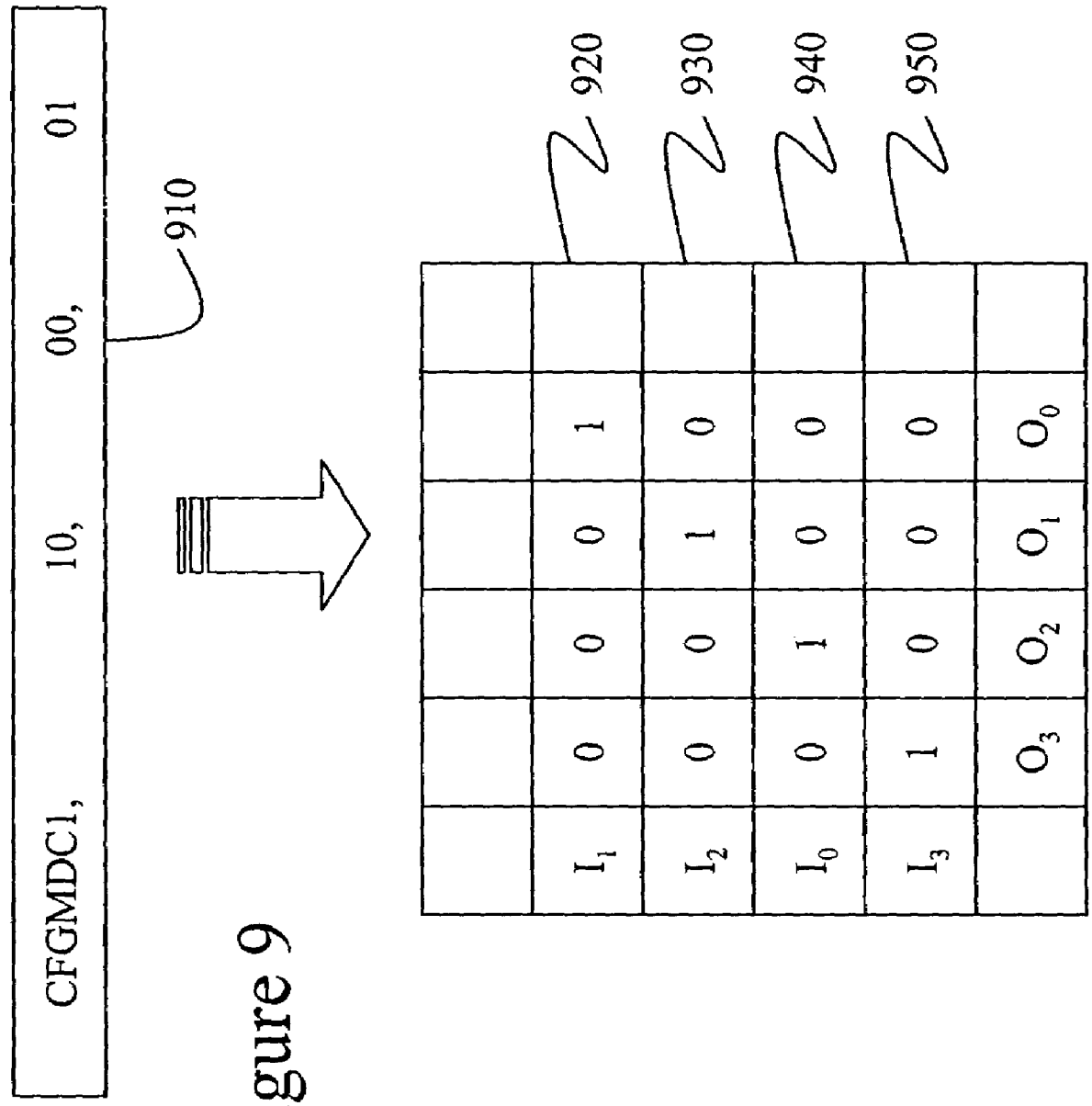
FIGS. 9-10 illustrate an example of a command to configure a reconfigurable interconnect resource, including illustration of the resulting mapping of inputs to outputs of the reconfigurable interconnect resource in accordance with at least one aspect of an illustrative embodiment of the present invention.
Figure 10:
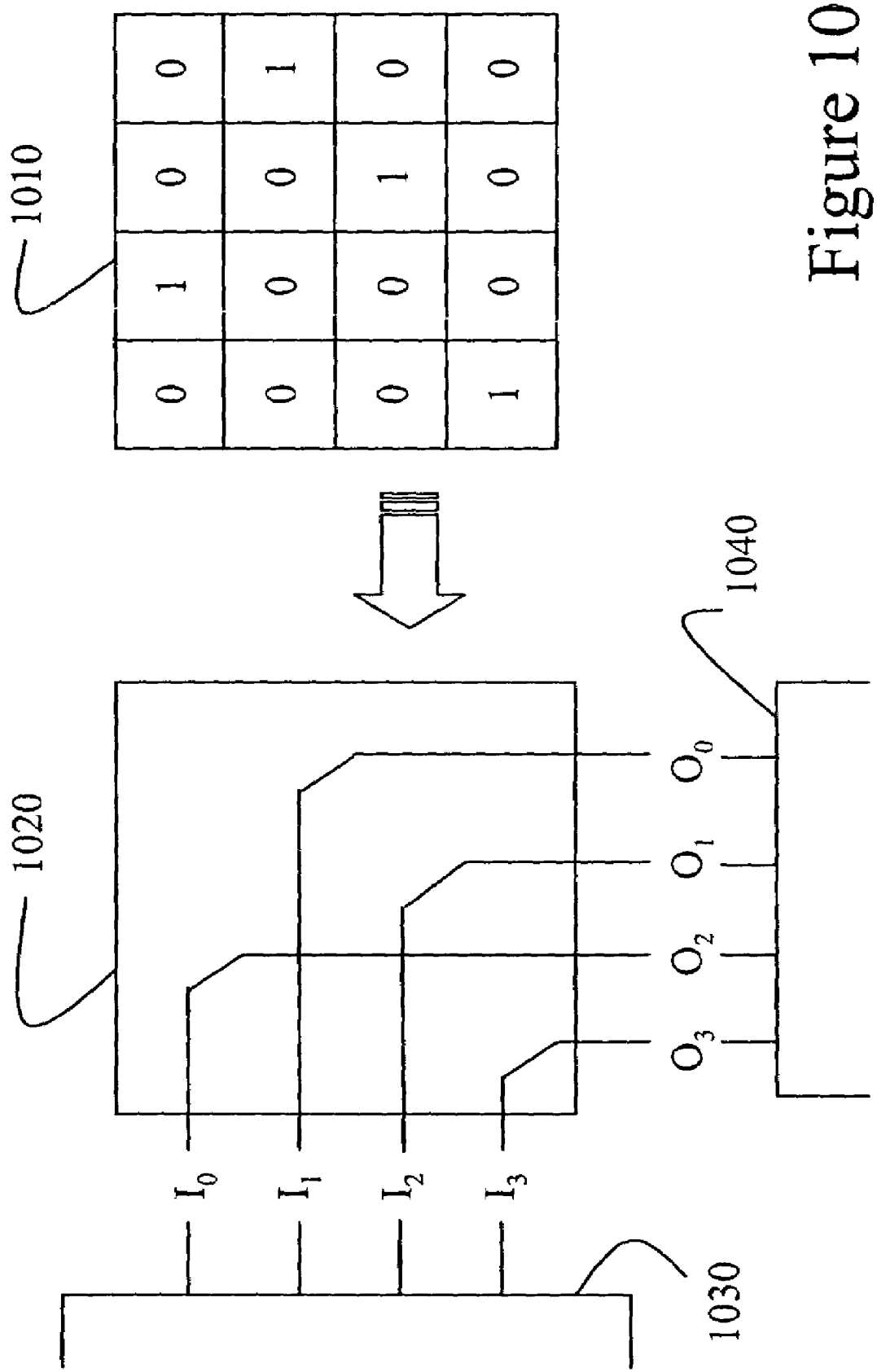
Figure 11:
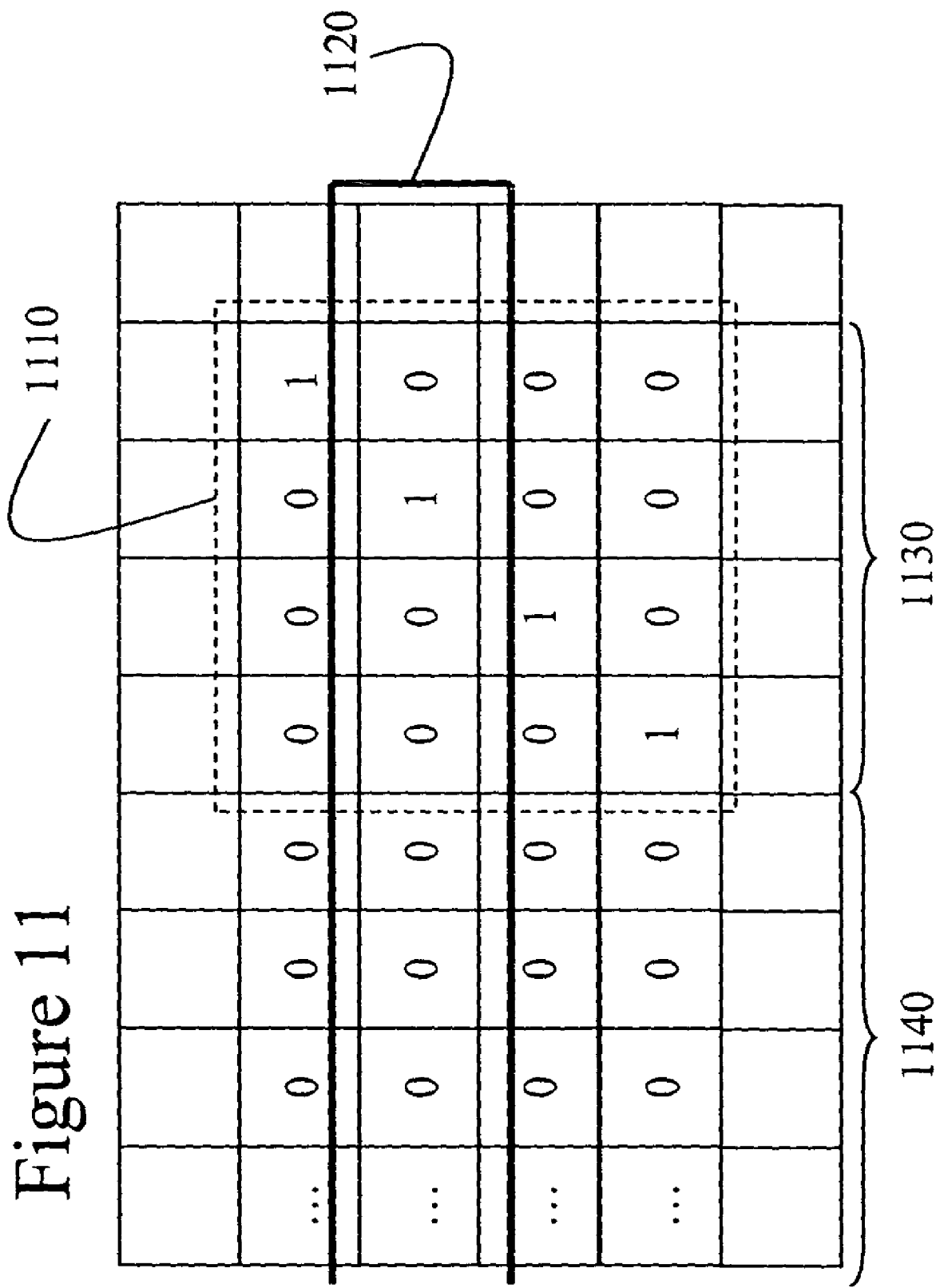
FIG. 11 illustrates extraction of configuration bits from a configuration bit look-up table in accordance with at least one aspect of an illustrative embodiment of the present invention.

FIGS. 9-10 illustrate an example of a command to configure a reconfigurable interconnect resource, such as reconfigurable interconnect resource 206, including illustration of the resulting mapping of inputs to outputs of the reconfigurable interconnect resource, in accordance with one embodiment of the present invention. Configuration of an n-input-by-n-output reconfigurable interconnect resource is described below. For the illustrative example of FIGS. 9 and 10, n is equal to 4. As shown in FIG. 9, command 910 includes index values for $I_0$ ($I_0$=10), $I_1$ ($I_1$=00), and $I_2$ ($I_2$=01) corresponding with rows 716, 718, and 720, respectively. Further, in accordance with one embodiment, command 910 includes three parameters 506, namely indices $I_1$, $I_2$, and $I_3$, where n is inferred to be the number of parameters included +1, i.e., 4. That is, in accordance with one embodiment, command 910 includes (n−1) indices, where the missing index can be determined. In this example, the missing index, $I_3$, corresponds with row 722. With this information, each input of a 4-input-by-4-output reconfigurable interconnect resource may be mapped to a unique output. As shown, row 920 includes the relevant portion of configuration bit table row 802 needed to map $I_1$ to $O_0$. Similarly, row 930 includes the relevant portion of configuration bit table row 804 needed to map $I_2$ to $O_1$, row 940 includes the relevant portion of configuration bit table row 806 needed to map $I_0$ to $O_2$, and row 950 includes the relevant portion of configuration bit table row 808 needed to map $I_3$ to $O_3$. Extraction of the relevant configuration bits, for example 920, from the corresponding configuration bit table row, for example 802, will be further described below (and illustrated in FIG. 11).

Thus, in accordance with one embodiment of the present invention, a configuration command 910 may be received by on-board data processing resources 202 and/or digital storage circuit 220, the relevant portion of command 902 containing a total of four index bits (two for each index), to load the configuration of a targeted reconfigurable interconnect resource, such as reconfigurable interconnect resource 206, the targeted reconfigurable interconnect resource being a selected one of multiple reconfigurable interconnect resources. Four (4) bits of information are received by on-board data processing resources 202 and/or digital storage circuit 220 to load the configuration of a 4-input-by-4-output reconfigurable interconnect resource instead of receiving all sixteen ($n^2$=16) configuration bits typically needed to configure such a 4-input-by-4-output reconfigurable interconnect resource. As those skilled in the art would appreciate, the above numbers are merely examples. For example, any number of n-input-by-n-output reconfigurable interconnect resources may be employed following the same examples. The number of configuration bits to be transferred onto emulation logic boards 105 to configure reconfigurable interconnect resources is in any event reduced. In a similar manner, for configuration of an 8-input-by-8-output reconfigurable interconnect, a command as in FIG. 6 may include 21 bits (seven 3-bit indices) to effectuate configuration of the n=8 reconfigurable interconnect resource, instead of receiving all 64 ($n^2$=64) configuration bits typical needed.

In various embodiments, different methods of determining n, the number of inputs and/or outputs of a reconfigurable interconnect to be configured, may be used. For the example shown in FIG. 9, the number of indices within command 910 provided enough information to determine n. Command 910 includes three indices indexing three particular rows of configuration bit look-up table 800. Given that the three indices represent (n−1) inputs, n is then equal to four. In an alternate embodiment, the command field 504 alone may include enough information to determine n. In yet another embodiment, the parameters 506 may include fewer than (n−1) indices, thus providing only enough information to partially configure the targeted reconfigurable interconnect resource. In such case, the number of bits 706 associated with the index value 704 along with predefined outputs 712 corresponding with each particular input index value 704 may be used to determine n.

Referring to FIG. 10, the mapping of inputs to outputs of a reconfigurable interconnect resource in conjunction with the illustrative command 910, in accordance with one embodiment, is shown. The relevant configuration bits 1010 are shown with the rows re-ordered to match up with inputs $I_0$, $I_1$, $I_2$, and $I_3$ of reconfigurable interconnect resource 1020. Each binary "1" included in relevant configuration bits 1010 results in a logical connection between an input and an output as shown, thereby logically interconnecting emulation component 1030 with emulation component 1040. Emulation components 1030 and 1040 may be any number of emulation components, including, but not limited to, any of the multiple reconfigurable interconnect resources.

As described above, FIG. 11 illustrates extraction of configuration bits (or configuration bit streams) from a configuration bit table, in accordance with one embodiment of the present invention. In particular, building upon the illustrative example in FIG. 9, configuration bits 1110 (designated within a dotted line box) are determined by operating on each particular row 1120 of configuration bit look-up table 800, accessing the least significant bits 1130, and effectively truncating the most significant bits 1140, as illustrated. For configuration bit table row 1120, the extracted least significant bits 1130 are "0010" and the truncated most significant bits 1140 include all zeros left of the right-most four columns. In one embodiment, accessing relevant configuration bits 1110 includes driving least significant bit (1130) address lines of a storage unit having configuration bit look-up table 800 stored therein.

Figure 12:
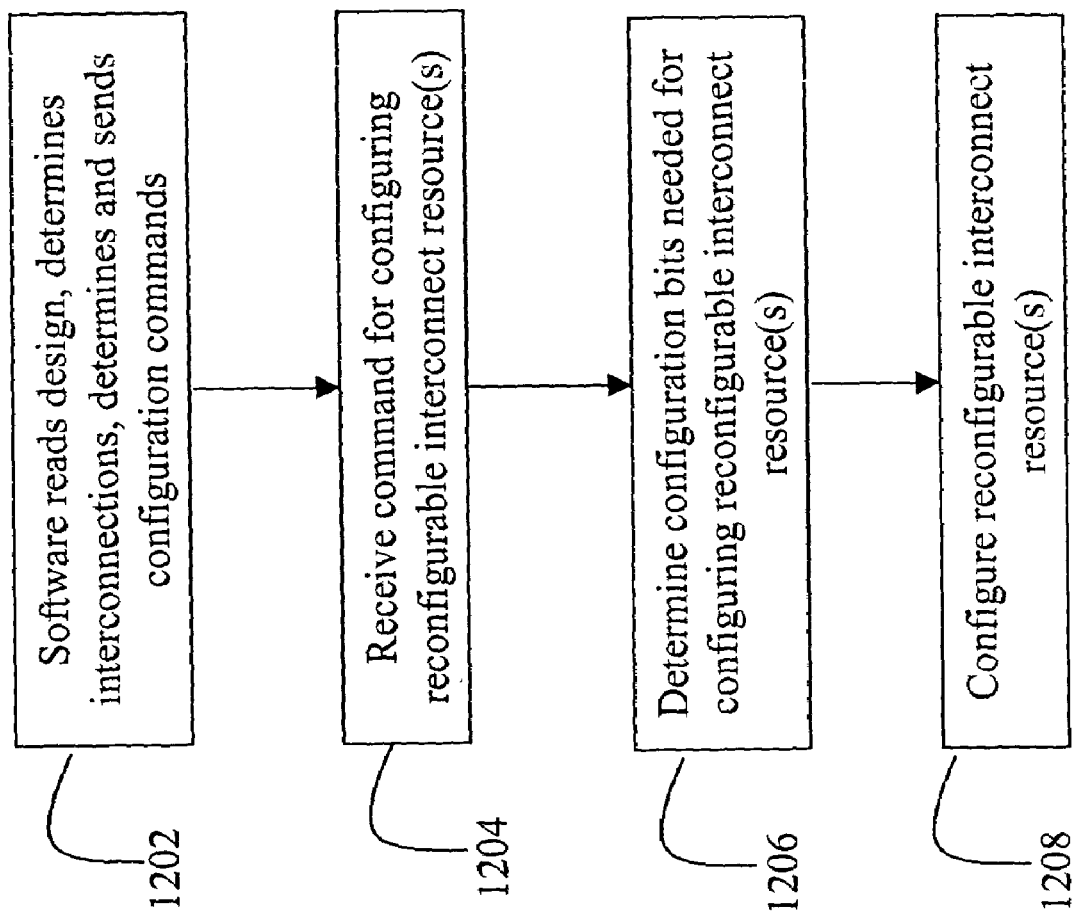
FIGS. 12-13 illustrate operational flow for configuration of reconfigurable interconnect resources of an emulation system in accordance with at least one aspect of an illustrative embodiment of the present invention.

Referring to FIG. 12, a flow diagram is shown illustrating the operational flow for configuration of reconfigurable interconnect resources such as reconfigurable interconnect resource 206, in accordance with one embodiment. In one embodiment, on-board data processing resources 202 and/or digital storage circuit 220 are provided with various information, including, but not limited to assigned netlists of partitions of the circuit design to be emulated, configuration information for reconfigurable resources of the emulation integrated circuits 204 of the emulation boards 105 (for "realizing" combinational logic of the circuit design to be emulated), and configuration bit streams and/or configuration commands for configuring selected ones of the reconfigurable interconnect resources. In accordance with one embodiment, on-board data processing resources 202 and/or digital storage circuits 220 perform, on behalf of and under the direction of control resources, local determination of configuration bit streams to configure selected ones of the multiple reconfigurable interconnect resources as well as configuring the reconfigurable interconnect resources with such configuration bit streams. On-board data processing resources 202 and/or digital storage circuits 220 are also provided with identifications of the reconfigurable interconnect resources and other emulation resources (not described) as well as information such as the address locations of storage resources having configuration bit look-up table 800 stored therein. Such information, in accordance with one embodiment, is provided to on-board data processing resources 202 and/or digital storage circuit 220 at system initialization or a combination of initialization and in conjunction with other implementation dependent operations.

As illustrated, at step 1202, software reads a circuit design to be emulated, determines the interconnections needed to "realize" the design, determines configuration commands to locally, i.e., distributively, configure the reconfigurable interconnect resources, and sends the configuration commands to on-board data processing resources 202 and/or digital storage circuit 220 via communication packets 500. At step 1204, on-board data processing resources 202 and/or digital storage circuits 220 receive configuration commands for configuring the reconfigurable interconnect resources. Responsive to these commands, at step 1206, on-board data processing resources 202 and/or digital storage circuit 220 determines the configuration bit stream or configuration bits needed for configuring the reconfigurable interconnect resources, using the configuration bit look-up table 800. At step 1208, on-board data processing resource 202 and/or digital storage circuit 220 configures the reconfigurable interconnect resources using the determined configuration bit streams in step 1206.

Figure 13:
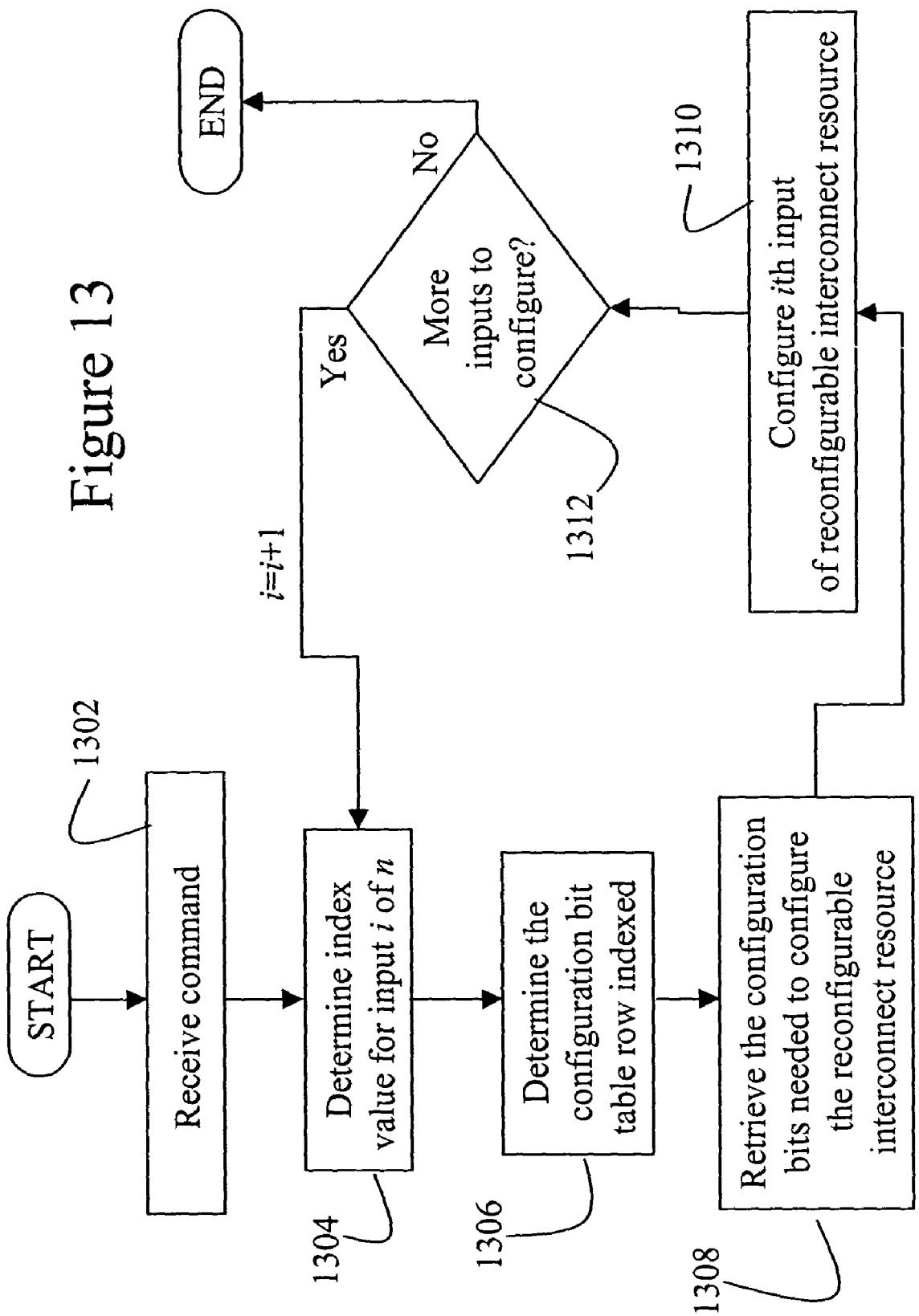

FIG. 13 illustrates a method for determining the configuration bits to configure a particular reconfigurable interconnect resource, in accordance with one embodiment. At step 1302, on-board data processing resources 202 and/or digital storage circuits 220 receive a command. At step 1304, on-board data processing resources 202 and/or digital storage circuits 220 determine the index value for the first index (or the ith index) in the command received. Using the index value from step 1304 (and extending it where necessary), on-board data processing resources 202 and/or digital storage circuits 220 determine the configuration bit table row indexed in step 1306. At step 1308, on-board data processing resources 202 and/or digital storage circuits 220 retrieve the configuration bit stream needed to configure the reconfigurable interconnect resource. In one embodiment, step 1308 includes extracting the least significant bits from an indexed row of stored configuration bit look-up table 800. The extracting step may include on-board data processing resources 202 and/or digital storage circuits 220 driving address lines of a storage unit having configuration bit look-up table 800 stored therein and using information included with the received command in step 1302 to ascertain the number of inputs and outputs of the reconfigurable interconnect resource that are to be configured. Having determined the configuration bit stream needed, step 1310 includes configuring the ith input of the targeted reconfigurable interconnect resource, thereby logically connecting the ith input with a particular output. At step 1312, a determination is made as to whether more inputs need to be configured, e.g., whether i=n. If more inputs need to be configured, the process returns to step 1304, incrementing to the next input, i=i+1, until all inputs of the targeted (or assigned) reconfigurable interconnect resource are logically connected (or mapped) with a particular output.

While the invention has been described with respect to a reconfigurable interconnect resource, those of skill in the art will appreciate that the inventive principles can be used for any interconnect portion of any integrated circuit, and is not limited for use only with dedicated reconfigurable interconnect resources. Also, while the present invention has been described with regard to an emulation environment, it will be recognized that the present invention may be practiced in other environments that configure reconfigurable interconnect resources. Further, all references to bits set to zero or one are illustrative and may be reversed, and references to rows and columns and directions along the bit table may likewise be reversed.

While the methods and systems of the present invention have been described in terms of the above illustrated embodiments, those skilled in the art will recognize that the various aspects of the present invention can be practiced with modification and alteration within the spirit and scope of the appended claims. The description is thus to be regarded as illustrative instead of restrictive of the present invention. For example, each of the elements of the aforementioned embodiments may be utilized alone or in combination with elements of the other embodiments. There are any number of alternative combinations for defining the invention, which incorporate one or more elements from the specification, including the description, claims, and drawings, in various combinations or sub-combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It is intended that the written description of the invention contained herein covers all such modifications and alterations.

We claim:

1. An integrated circuit, comprising:
   a reconfigurable interconnect portion;
   a data processing portion coupled to the reconfigurable interconnect portion, the data processing portion configured to provide a bit pattern to the reconfigurable interconnect portion to load a configuration of the reconfigurable interconnect portion; and
   a storage unit coupled to the data processing portion, the storage unit including a configuration bit look-up table, wherein the data processing portion is configured to extract a set of bits from the configuration bit look-up table to map a common plurality of inputs of the reconfigurable interconnect portion to a plurality of outputs of the reconfigurable interconnect portion.

2. The integrated circuit of claim 1, wherein the integrated circuit includes a second reconfigurable interconnect portion, and the configuration bit look-up table is configured to allow the data processing portion to extract a first set of configuration bits representing the bit pattern and to extract a second set of configuration bits representing a second bit pattern to load a second configuration of the second reconfigurable interconnect portion, wherein the second set is a subset of the first set.

3. The integrated circuit of claim 1, wherein the reconfigurable interconnect portion comprises a switching matrix.

4. The integrated circuit of claim 1, wherein reconfigurable interconnect portion comprises a multiplexer.

5. The integrated circuit of claim 3, wherein the switching matrix includes a control signal input configured to select between two inputs to connect to an output.

6. The integrated circuit of claim 1, wherein the reconfigurable interconnect portion comprises a pair of transistors.

7. The integrated circuit of claim 1, wherein the reconfigurable interconnect portion comprises a plurality of memory elements, each memory element connected to at least one switch of the reconfigurable interconnect portion.

8. The integrated circuit of claim 1, wherein the bit pattern is derived from the configuration bit look-up table.

9. The integrated circuit of claim 1, wherein the configuration bit look-up table comprises a plurality of rows of configuration bits.

10. The integrated circuit of claim 9, wherein the storage unit is coupled to the data processing portion by a plurality of address lines for accessing the rows of configuration bits stored within the storage unit.

11. The integrated circuit of claim 10, wherein the storage unit further comprises programming instructions configured for accessing the configuration bit look-up table, wherein the programming instructions are further configured for extracting a subset of configuration bits from the configuration bit look-up table.

12. The integrated circuit of claim 1, wherein the data processing portion is configured to map a first input of the common plurality of inputs of the reconfigurable interconnect portion to a first output of the plurality of outputs of the reconfigurable interconnect portion in response to a first command.

13. The integrated circuit of claim 12, wherein the data processing portion is configured to map a second input of the common plurality of inputs of the reconfigurable interconnect portion to a second output of the plurality of outputs of the reconfigurable interconnect portion in response to the first command.

14. The integrated circuit of claim 12, wherein the data processing portion is configured to map a second input of the common plurality of inputs of the reconfigurable interconnect portion to a second output of the plurality of outputs of the reconfigurable interconnect portion in response to a second command.

15. The integrated circuit of claim 12, further comprising a second reconfigurable interconnect portion, and wherein the data processing portion is configured to map a first input of the second reconfigurable interconnect portion to a first output of the second reconfigurable interconnect portion in response to a second command.

16. An integrated circuit, comprising:
   a reconfigurable interconnect portion;
   a data processing portion coupled to the reconfigurable interconnect portion, the data processing portion configured to provide a bit pattern to the reconfigurable interconnect portion to load a configuration of the reconfigurable interconnect portion; and
   a storage unit coupled to the data processing portion, the storage unit including a look-up table,
   wherein the look-up table is configured to allow the data processing portion to extract a first set of bits representing the bit pattern and to extract a second set of bits representing a second bit pattern to load a second configuration of a second reconfigurable interconnect portion,
   wherein the second set is a subset of the first set,
   wherein the extraction of the second set of bits from the look-up table maps a common plurality of inputs of the reconfigurable interconnect portion to a plurality of outputs of the reconfigurable interconnect portion.

* * * * *